United States Patent [19]
Appert et al.

[11] Patent Number: 5,410,398
[45] Date of Patent: Apr. 25, 1995

[54] AUTOMATIC BORESIGHT COMPENSATION DEVICE

[75] Inventors: Quentin D. Appert, Los Alamos, N. Mex.; Thomas E. Godfrey, Orange, Calif.; David L. Hammond, Newport Beach, Calif.; Gary O. McFerson, Santa Ana, Calif.; Richard F. Odum, Placentia, Calif.; Raymond H. Ottoson, Riverside, Calif.

[73] Assignee: Northrop Grumman Corporation, La.

[21] Appl. No.: 67,774

[22] Filed: Aug. 20, 1979

[51] Int. Cl.⁶ .................. G01B 11/26; G01C 1/00
[52] U.S. Cl. .................. 356/141.3; 89/41.06; 244/3.13
[58] Field of Search ............ 356/152; 244/3.13; 89/41 L, 41.06

[56] References Cited
U.S. PATENT DOCUMENTS

| | | |
|---|---|---|
| 3,807,658 | 4/1974 | Miller, Jr. et al. .................. 244/3.13 |
| 4,173,414 | 11/1979 | Vauchy et al. .................. 356/152 |

FOREIGN PATENT DOCUMENTS

| | | | |
|---|---|---|---|
| 3085 | 7/1979 | European Pat. Off. ............ 89/41 L |
| 2429006 | 8/1976 | Germany .......................... 356/152 |
| 2625081 | 8/1977 | Germany .......................... 356/152 |

Primary Examiner—Stephen C. Buczinski
Attorney, Agent, or Firm—Terry J. Anderson; Karl J. Hoch, Jr.

[57] ABSTRACT

A device for automatically compensating for dynamic boresight errors between a visual line of sight and the apparent center of a beam of radiation emitted by the device. The radiation emitted by the device is used to guide a "beam-riding" missile to its target. Different sectors of the beam radiated by the device are modulated by different codes so that the missile can sense the apparent center of the beam. Optics within the device sense the extent to which the visual line of sight deviates from the apparent center of the radiated beam by means of measurements upon the coincidence of the visual line of sight and the apparent center of the beam of radiation within the device. The device then alters the coding of the radiated beam so that the apparent center of the radiated beam maintains alignment with the visual line of sight.

2 Claims, 3 Drawing Sheets

AUTOMATIC BORESIGHT COMPENSATION DEVICE

BACKGROUND OF THE INVENTION

1. Field of the Invention

This system pertains to optical systems for projecting a beam of infrared or ultraviolet radiation, such as that emitted by a laser, for the purpose of guiding a beam-riding missile. In particular, the system of this invention pertains to means for automatically correcting the boresight error between the visual sightline through the optical system and the apparent center of the beam of radiation projected by the optical system, where the boresight error may vary with time.

2. Description of the Prior Art

A number of systems in the prior art provide for the correction of the boresight error between a visual line of sight and an infrared or visual beam of light where the error does not vary with time. These prior art systems generally are not automatic and are not continuous in their operation. As a consequence, they are of little or no use in correcting boresight errors that fluctuate as a function of time. For instance, if a "zoom" lens is included as part of the optical projection system so that the projected beam of radiation can be narrowed as the guided missile travels further from the projector, the operation of the "zoom" lens will introduce time varying boresight errors. Mechanical deformations and thermal stress also may cause fluctuating boresight errors.

A system for offsetting the apparent center of a projected beam of radiation for the purpose of compensating a missile guidance system for the effects of target motion is described by Miller Jr. et al. U.S. Pat. No. 3,807,658. The invention described in the present application utilizes the method described by Miller or any of the various other means available for offsetting the apparent center of the projected beam of light, in combination with a means for detecting boresight errors to automatical and continuously correct the boresight errors that are either fixed or fluctuate with time.

SUMMARY OF THE INVENTION

In this invention, an optical line of sight is oriented in near coincidence with the center of a projected beam of radiation by means of optical lenses, prisms and mirrors. The beam of radiation to be projected and the optical line of sight are split into two parts by means of a partially reflecting and partially transmitting surface such that the coincidence within one part of the apparatus of the line of sight and the apparent center of a portion of the beam of radiation is indicative of the coincidence external to the system of the line of sight and the apparent center of the beam of radiation projected by the system of this invention. The errors in coincidence of the visual line of sight and the apparent center of a part of the beam of radiation are corrected by automatically altering the apparent center of the light beam in a manner such as that described in Miller, supra. Because the missile guided by the beam of radiation follows the "apparent" center of the beam, in the manner described in Miller, the missile "thinks" that the center of the beam of radiation lies along the visual line of sight.

DESCRIPTION OF THE PREFERRED EMBODIMENT

Figure 1:
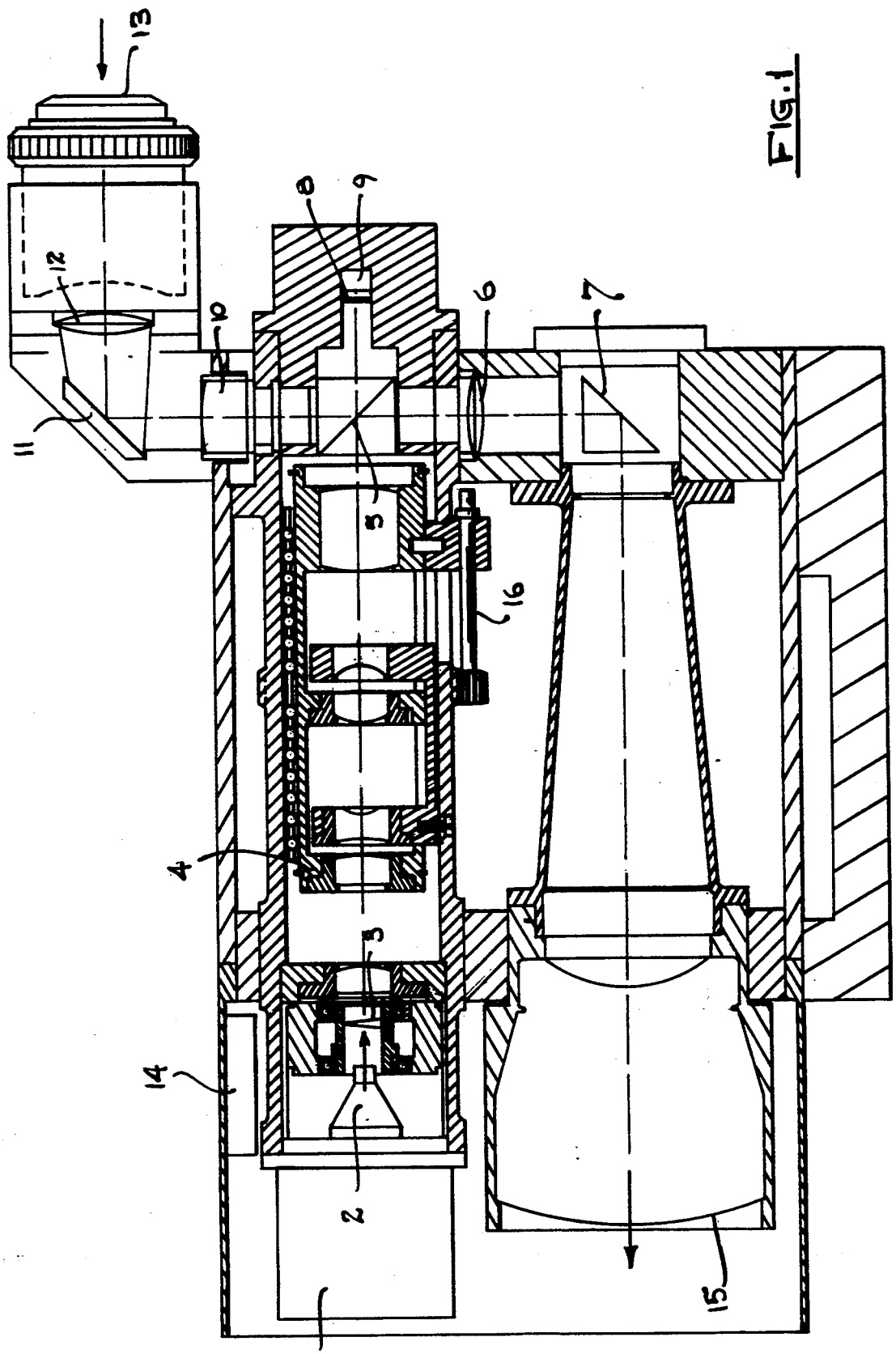
FIG. 1 is a cross-sectional view of the system of this invention.

Referring now to FIG. 1. Laser 1 consists of an array of diode lasers divided into sectors, in this case into four quadrants each quadrant of which is modulated by a coded frequency in the manner described by Miller et al. in U.S. Pat. No. 3,807,658. The outputs from each quadrant are optically integrated by laser quadrant integrator 2. The laser 1 and the laser quadrant integrator 2 together constitute a radiation source and coding means which operates in the manner described in Miller, supra. The beam of radiation exiting from the laser quadrant integrator 2 passes through coaxial nutator 3 wherein the beam of radiation is caused to nutate.

In the preferred embodiment, the beam of radiation next passes through a zoom lens 4 which, when actuated by zoom lens actuator 16, alters the width of the beam of radiation projected by the system. By reducing the cross-sectional size of the beam projected by the system as the missile moves further away from the radiation source, the size of the beam, as viewed from the missile, can be maintained relatively constant. However, an undesirable side effect of the operation of the zoom lens is the introduction of small angular changes in the direction of the beam of radiation that exits from the zoom lens 4 which, if it were not for the operation of the system of this invention, would cause the apparent center of the projected beam to depart from the visual line of sight of the beam projector. The guidance of a missile by such beam of radiation is described in more detail in Miller, supra.

In the preferred embodiment, the zoom lens 4 is the predominant cause of the pointing errors introduced into the system. However, the errors introduced by the operation of a zoom lens are but an example of the types of errors and their sources that can be corrected by the system of this invention. More generally, this system operates to correct boresight errors such as those due to shift of the laser light source, to a mechanical drift in the visual line of sight, to initial fabrication and assembly alignment errors, and to subsequent thermal or mechanical stresses and strains.

The beam of radiation from the zoom lens 4 impinges on beam splitter 5 which reflects almost all of the incident light into field lens 6, then impinges on folding prism 7, and finally passes through objective lens 15, all of which serve to focus the beam of radiation at a large distance from the beam projector (a distance approaching infinity). A small portion of the beam of radiation impinging on beam splitter 5 passes directly through the beam splitter and impinges on optical reticle 8 and detector 9. The optics within the nutator 3, and the zoom lens 4 are arranged so as to focus on the optical reticle 8, the portion of the beam of radiation impinging on the optical reticle.

The visual line of sight from the target or the aim point enters objective lens 15, is reflected by folding prism 7, passes through field lens 6, strikes beam splitter 5 which passes most of the light from the target straight through the beam splitter 5 to relay/erector lens 10. Emerging from relay/erector lens 10, the optical line of sight is reflected by folding mirror 11, passes through field lens 12, and emerges from eyepiece 13 into the eye of the operator. Field lens 6, folding prism 7 and objective lens 15 have the dual purposes of focusing both the visual line of sight and the projected beam of radiation.

Optical reticle 8 is illuminated by reticle lamps 17 (see FIG. 3) so as to cause light coming from the back lighted reticle through alignment slits 18 (see FIG. 2) to strike beam splitter 5 where a small portion of that light is reflected through relay/ erector lens 10, is reflected by folding mirror 11, passes through 8 field lens 12, and emerges from eyepiece 13 for visual observation and visual aim point selection.

Figure 3:
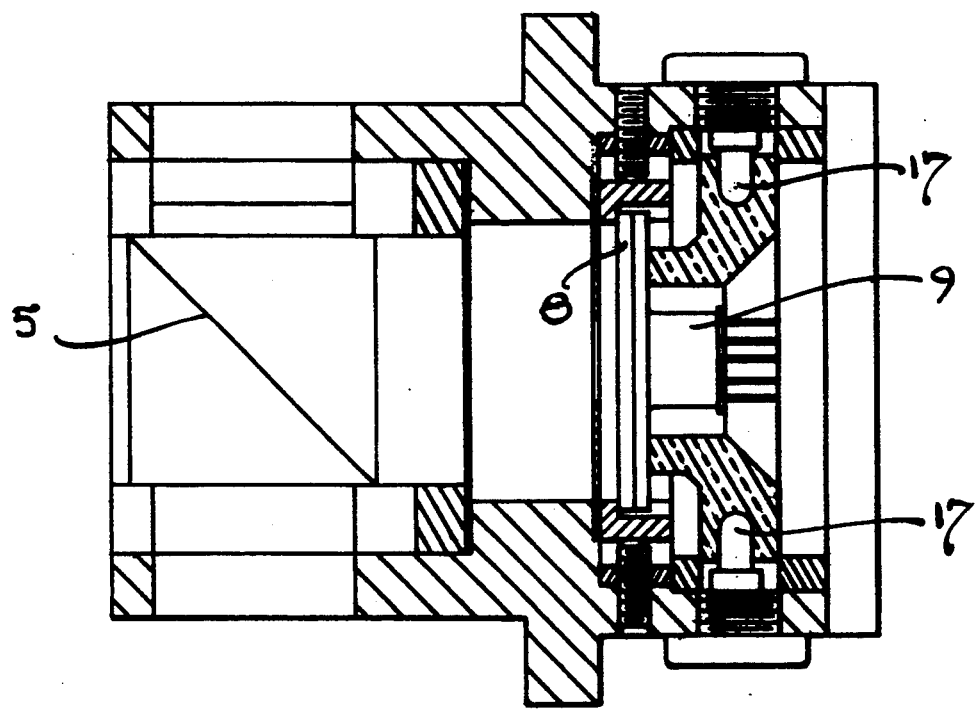
FIG. 3 shows a more detailed view of the boresight assembly.
Figure 2:
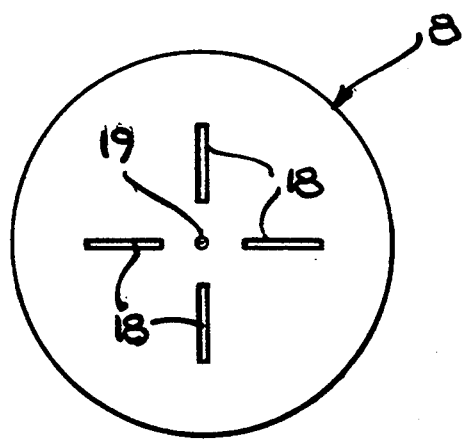
FIG. 2 shows a view of the visual reticle and the radiation beam pinhole.

Referring now to FIG. 2, optical reticle 8 has a small pinhole 19 at its center which allows a small portion of the beam of radiation incident from the radiation source to pass through to detector 9 which detector is illustrated in FIG. 3. In a manner such as that described by Miller et al. in U.S. Pat. No. 3,807,658, the output from detector 9 is processed to obtain, in a manner analogous to the missile detector, an error signal which represents the amount by which the apparent center of the impinging beam of radiation is dislocated from the pinhole in the reticle. In the manner described by Miller, the error signal is then utilized to alter the coding of the radiation sources in each of the four quadrants in laser 1 so as to cause the apparent center of the radiation source to shift so as to be aligned with the pinhole in optical reticle 8. Referring again to FIG. 1, the error signal from detector 9 enters automatic boresight servo mechanism electronics 14 which integrate the error signal and cause the frequencies of modulation of the quadrants within laser 1 to be adjusted in the manner described by Miller. The time constant of the feedback integrator is selected so as to accommodate the rate at which errors are introduced by the zoom lens 4 while at the same time providing stable operation and negligible boresight errors between the apparent center of the projected beam of radiation and the visual line of sight.

Figure 4:
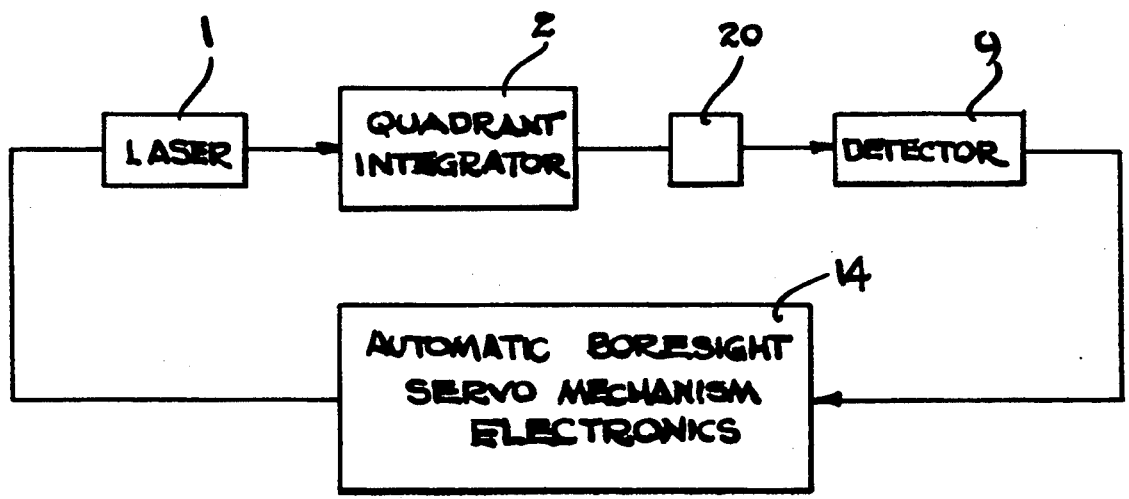
FIG. 4 is a block diagram that shows the optical/electronic feedback path.

Referring now to FIG. 4. The operation of the system may be summarized as follows: the optical energy emitted from laser 1 exits from quadrant integrator 2 in the form of a beam having four quadrants, each quadrant being identified by a particular modulation frequency. The beam passes through the optical system 20, the details of which are shown in detail in FIGS. 1, 2 and 3, and which optical system causes the beam to nutate. Detector 9 senses the beam and the modulation frequencies thereof. Any deviation of detector 9 from the center of the nutating beam appears as an imbalance in the fractions of time during which the detector receives each of the modulation frequencies. The automatic boresight servo mechanism electronics 14 responds to any such imbalance and causes the modulation of the diode lasers in each quadrant of laser 1 to be altered in the manner described in Miller so as to shift the apparent center of the nutating beam to coincide with detector 9. As is described in Miller, the apparent center of the nutated beam is shifted by altering the modulation of each quadrant. For example, if the apparent center of the beam is located to the left of detector 9, as viewed from detector 9, then the modulation frequencies of the right two quadrants of the beam, as viewed from detector 9, are replaced for short periods of time, with the modulation frequencies for the respective adjacent left quadrants so that the portions of time during which detector 9 receives each modulation frequency are again in balance.

In the preferred embodiment, the objective lens 15 is a three-inch diameter lens with a focal length of 10 inches. The optical system, as seen by the operator, exhibits approximately a 6 degree field of observation and 10 power magnification. The beam splitter 5 passes approximately 1% of the infrared beam of light through to the reticle and pinhole and transmits approximately 90% of the visual light incident thereon while reflecting approximately 10%. The average pulse rate within the laser quadrant source is approximately 5 kilohertz. The nutation frequency is 60 hertz; the pinhole is 0.001 inches in diameter; and the system provides a dynamic alignment accuracy of the apparent center of the projected beam of radiation to the visual line of sight of approximately 20 microradians.

We claim:

1. A technique, and means for implementing said technique, for automatically correcting the apparent boresight error between a visual line of sight and a projected beam of radiation comprising:
   (a) radiation source and coding means for generating and forming a beam of radiation and for coding different sectors of the beam of radiation so as to enable identification of the different sectors of the beam of radiation,
   (b) nutation means for causing the beam of radiation to nutate,
   (c) radiation alignment sensing means for sensing the different sectors of the radiation incident thereon and for providing a visual reference with respect to the location of the radiation alignment sensing means,
   (d) beamsplitter means, for splitting the beam of radiation into first and second parts and also for splitting the visual line of sight into first and second parts, and oriented so as to bring the first and second parts of the visual line of sight respectively into near coincidence with the first and second parts of the beam of radiation,
   (e) visual eyepiece means for focusing the first part of the visual line of sight upon the radiation alignment sensing means,
   (f) radiation beam focusing means for focusing the first part of the beam of radiation upon the radiation alignment sensing means,
   (g) dual purpose focusing means for simultaneously focusing both the second part of the visual line of sight and the second part of the beam of radiation at a long focal length, and
   (h) feedback means for identifying the different sectors of the first part of the beam of radiation sensed by the radiation alignment sensing means and for adjusting the radiation source and coding means so as to alter the coding of the different sectors of the beam of radiation such that the apparent boresight of the first part of the beam of radiation is centered upon the radiation alignment sensing means.

2. A technique, and means for implementing said technique, for automatically correcting the apparent boresight error between a visual line of sight and a projected beam of radiation comprising:
   (a) radiation source and coding means for generating and forming a beam of radiation and for coding different sectors of the beam of radiation so as to enable identification of the different sectors of the beam of radiation,
   (b) nutation means for causing the beam of radiation to nutate, (c) an optical reticle having a pinhole in its center for admitting a small segment of the radiation thereon, (d) radiation sensing means for sensing the radiation passing through the pinhole in the reticle, (e) beamsplitter means, for splitting the beam of radiation into first and second parts and also for splitting the visual line of sight into first and second parts, and oriented so as to bring the first and second parts of the visual line of sight respectively into near coincidence with the first and second parts of the beam of radiation, (f) visual eyepiece means for focusing the first part of the visual line of sight upon the reticle, (g) radiation beam focusing means for focusing the first part of the beam of radiation upon the pinhole in the reticle, (h) dual purpose focusing means for simultaneously focusing both the second part of the visual line of sight and the second part of the beam of radiation at a long focal length, and (i) feedback means for identifying the different sectors of the first part of the beam of radiation sensed by the radiation sensing means and for adjusting the radiation source and coding means so as to alter the coding of the different sectors of the beam of radiation such that the apparent boresight of the first part of the beam of radiation is centered upon the pinhole in the reticle.

* * * * *